(No Model.)

G. S. STRONG.
FORGING DIE.

No. 505,540. Patented Sept. 26, 1893.

Witnesses:
Henry Drury
J. F. Russell

Inventor:
George S. Strong
by his atty
Francis T. Chambers

UNITED STATES PATENT OFFICE.

GEORGE S. STRONG, OF NEW YORK, N. Y., ASSIGNOR TO JAMES N. GAMBLE, OF CINCINNATI, OHIO.

FORGING-DIE.

SPECIFICATION forming part of Letters Patent No. 505,540, dated September 26, 1893.

Application filed February 11, 1892. Serial No. 421,108. (No model.)

*To all whom it may concern:*

Be it known that I, GEORGE S. STRONG, of the city, county, and State of New York, have invented a certain new and useful Improvement in Forging-Dies, of which the following is a true and exact description, reference being had to the accompanying drawings, which form a part of this specification.

My invention relates to the construction of a forging die especially adapted for forging or welding together a series of bent wrought iron plates or bars into an electro-magnet field. In other applications for Letters Patent which I have filed I have shown and described the fields which this machine is adapted to make, and my present application relates entirely to the forging machine by which the assembled parts of the field are forged and welded together.

The nature and purpose of my invention will be best understood as described in connection with the drawings in which it is illustrated, and in which—

Figure 1:
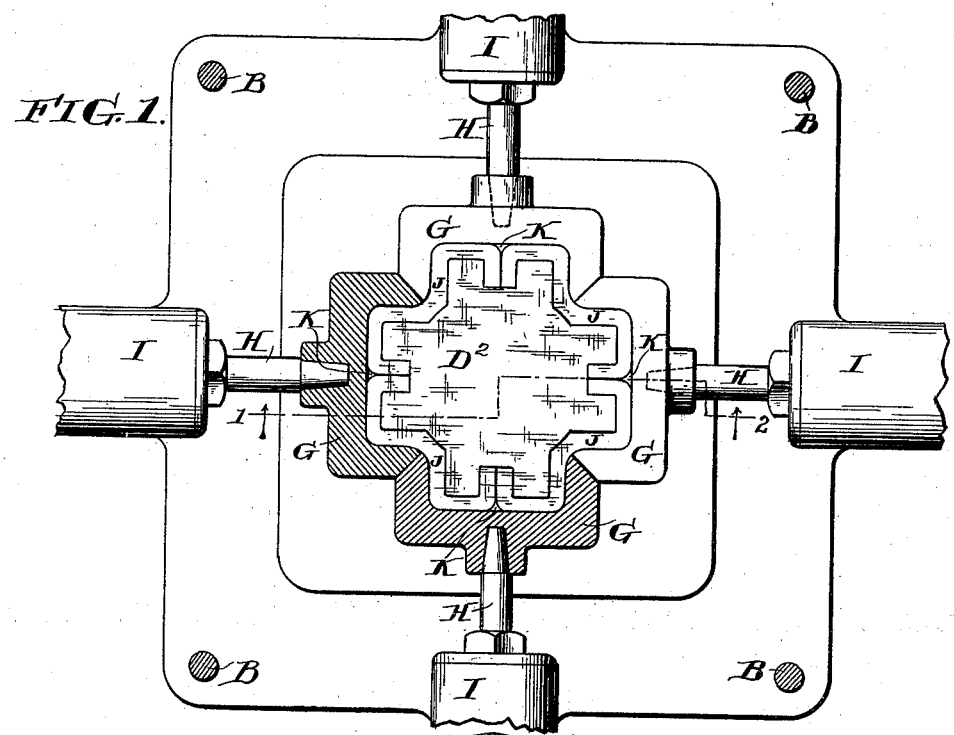
Figure 2:
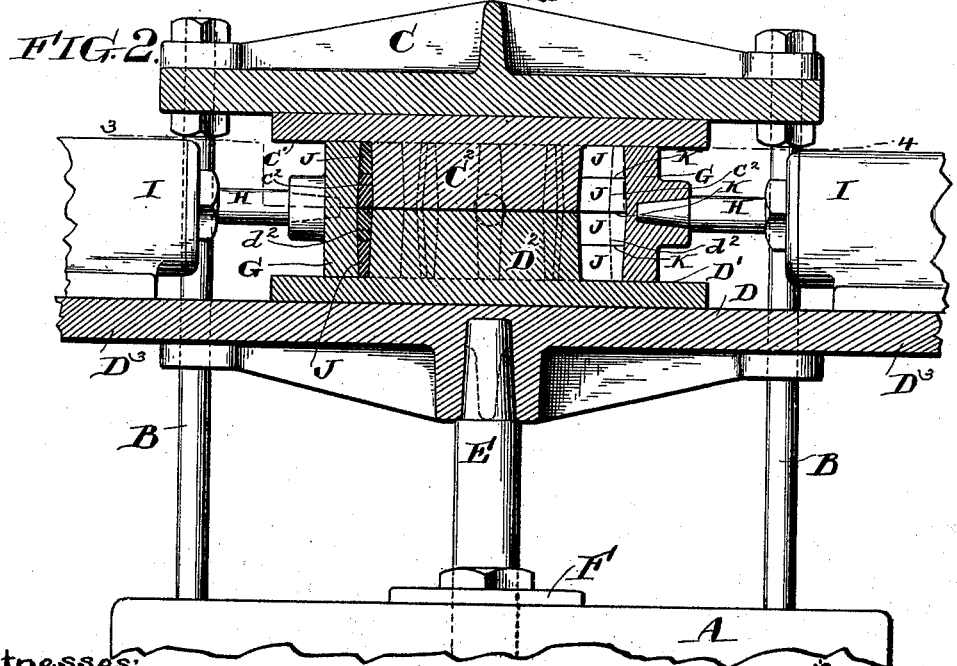

Figure 1 is a plan view of my forging machine taken on the section line 3—4 of Fig. 2, and—Fig. 2 is a sectional side elevation on the line 1—2 of Fig. 1.

The machine as constructed is adapted for the manufacture of an eight-pole field having four salient and four consequent poles.

A is the foundation or bed-plate of the machine; B B, &c., standards secured to the bed-plate A, and supporting at their upper ends a plate C, to which in turn is secured the dies or die C' C², C' being a flat plate from the center of which extends the part C², this part having a periphery corresponding in form to that of the field which is to be made by its assistance. Preferably the sides or edges $c^2$ of the part C² taper in an outward direction from the plate C' for reasons which will be best understood hereinafter. Beneath the die C' C² and guided on the rods B is a plate D supporting on its upper face a die D' D² which corresponds in all respects with the parts C' C² of the upper die, the part D² having preferably tapering sides $d^2$ as in the case of the upper corresponding part; this lower die is shown as movable, the plate D being supported by a rod E which is actuated in any usual way by a ram or engine, the upper end of the cylinder of which is illustrated at F, but which it is not thought necessary to further exhibit in the drawings. It is obvious of course that the lower die may be made stationary and the upper die movable, for as will be seen, the important part is simply to secure a relatively backward and forward motion of these two dies.

G, G, G, G are horizontally moving dies secured on the ends of rods H which are actuated by rams or engines indicated at I, I, &c. These dies G all move in lines radiating from the center of the parts C². D². and act against the sides of these parts when they are in contact with each other. The operative faces of the dies G correspond with the outline of the outside of the field to be formed in the machine. Preferably the dies G and the rams indicated at I for actuating them are secured to and move with the movable die; thus as shown in the drawings the sectional dies G rest on the upper face of the part D', and their rams I are supported on extensions D³ of the movable plate D.

The field is made up of a series of wrought iron bars J J, &c., which are first bent to a general horseshoe form and then assembled to the general form of the field to be constructed, preferably with interposed wrought iron plates as indicated at K K, &c. The pile thus made up is brought to welding heat and then brought to the forging machine and placed over the part D² and upon the part D' of the lower movable die. The dies C' C² and D' D² are then brought together as by raising the lower die and the pile welded and compressed by the action of the plates C' and D' between which it is squeezed to the thickness of the field to be formed. This having been done the dies G G, &c., are moved in against the sides of the pile pressing it against the sides of the parts C² D², thus completing the welding together the parts making up the pile and bringing it to the determined form. The welding and forging of the pile being completed the dies are moved apart and the field removed to make way for another pile. The tapering of the parts C² D² is to facilitate the removal of the completed field.

It is obvious of course that the shape of the parts C². D². and G. will and must vary with the character of the field to be formed. All that is necessary in any case is to give the parts $C^2 D^2$ the form of the interior of the field and the sectional parts G G, &c., the form of the exterior of the field. The number of parts G may be varied, though four, as shown, will answer for most purposes.

Having now described my invention, what I claim as new, and desire to secure by Letters Patent, is—

1. The combination of the dies $C' C^2$ and $D' D^2$ movable to and from each other as specified with a series of dies G G &c., movable in a plane at right angles to the line of movement of dies $C' C^2$, $D' D^2$ and adapted to surround and act against the parts $C^2 D^2$ of said dies.

2. The combination of the dies $C' C^2$ and $D' D^2$ movable to and from each other as specified and having the sides of parts $C^2 D^2$ tapered outward as described, with a series of dies G, G. &c., movable in a plane at right angles to the line of movement $C' C^2 D' D^2$ and adapted to surround and act against the parts $C^2 D^2$ of said dies.

3. The combination of a fixed upper die $C' C^2$ a movable lower die $D' D^2$ and a series of horizontally movable dies G, G &c., arranged to move vertically with the die $D' D^2$, said dies G being adapted to act against the parts $C^2 D^2$ of the upper and lower dies substantially as and for the purpose specified.

GEORGE S. STRONG.

Witnesses:
    LISLE STOKES,
    FRANCIS T. CHAMBERS.